Aug. 16, 1966
J. F. SHERRILL
3,266,792
VEHICLE SHOCK STABILIZER
Filed Oct. 23, 1964
2 Sheets-Sheet 1
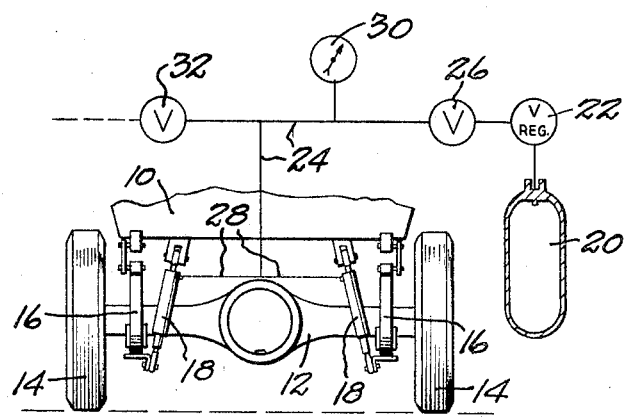
Fig 1
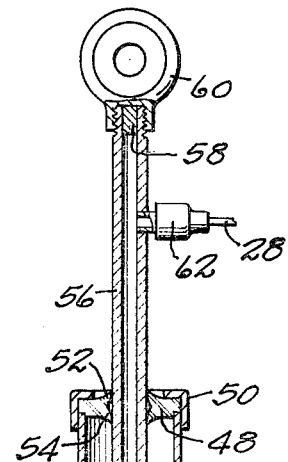
Fig 2
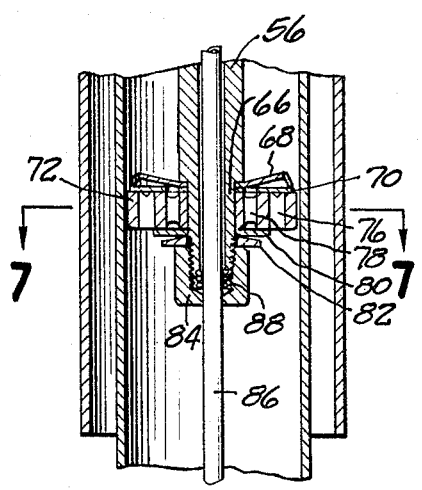
Fig 3
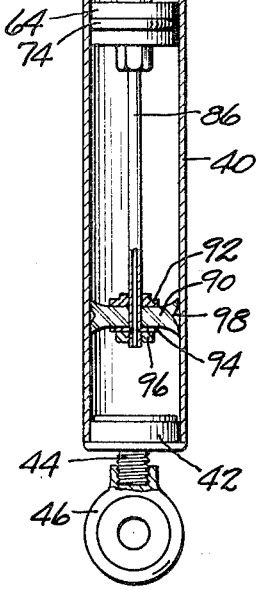
INVENTOR.
JOHN F. SHERRILL
BY Eugene C. Knoblock
ATTORNEY

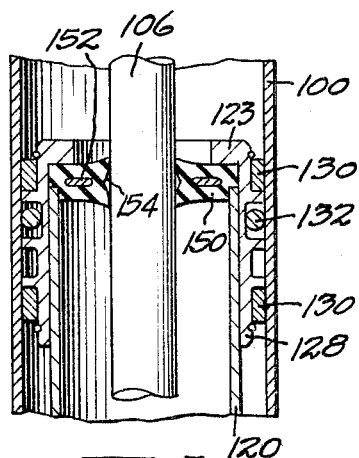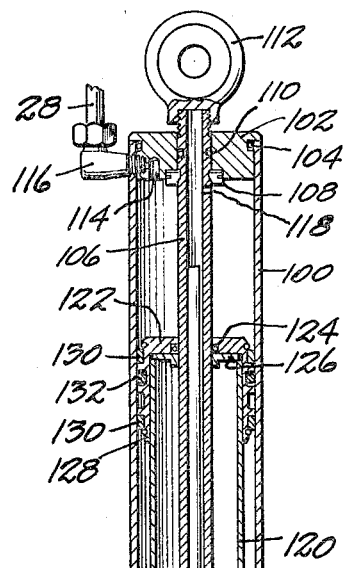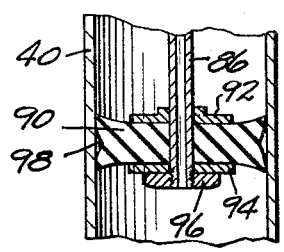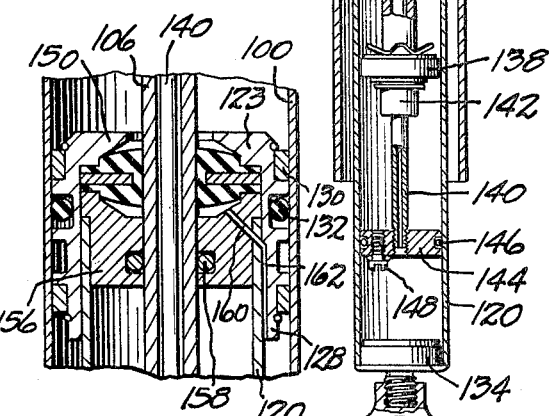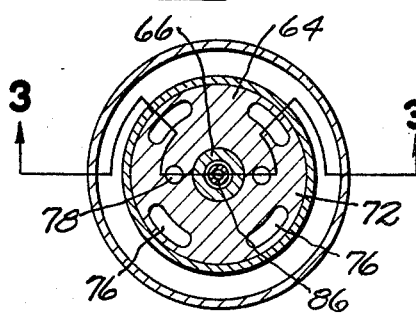
INVENTOR.
JOHN F. SHERRILL
ATTORNEY

United States Patent Office 3,266,792
Patented August 16, 1966

3,266,792
VEHICLE SHOCK STABILIZER
John F. Sherrill, % Lemert Engineering Co., Plymouth, Ind.
Filed Oct. 23, 1964, Ser. No. 406,129
7 Claims. (Cl. 267—64)

This invention relates to improvements in vehicle shock stabilizers, and more particularly to vehicle shock stabilizers which utilize the combined action of a hydraulic shock stabilizing unit and resilient means supplementing the action of such hydraulic means. The resilient means may constitute a charge of gas under pressure, and this application constitutes a continuation-in-part of my patent application, Ser. No. 322,300, filed November 8, 1963, for Load Leveling Shock Absorber, which discloses a unit having a hydraulic shock stabilizer supplemented by a charge of gas under pressure.

The primary object of this invention is to provide a novel, simple and inexpensive construction which is easy to manufacture and which is trouble-free in operation.

A further object is to provide a device of this character having a hydraulic shock stabilizing portion whose action is supplemented by a portion charged with gas under pressure, wherein novel seals are utilized, and a novel arrangement of hydraulic and gas charged means is provided. A further object is to provide a shock stabilizer of this type having novel, simple and inexpensive seals between gas-charged and liquid-containing chambers, and having novel vent means to insure against entrainment of gas in liquid and to insure against pumping of liquid past the seal and loss of liquid from the liquid-containing chamber of the device.

Other objects will be apparent from the following specification.

In the drawings:

FIG. 1 is an end view of a portion of a vehicle illustrating schematically the control for the shock stabilizer forming the subject of this invention;

FIG. 2 is an axial sectional view illustrating one embodiment of the shock stabilizer;

FIG. 3 is an enlarged longitudinal sectional view taken on line 3—3 of FIG. 7;

FIG. 4 is an axial sectional view illustrating a modified embodiment of the invention;

FIG. 5 is a fragmentary enlarged axial detail sectional view of the construction illustrated in FIG. 4, illustrating a modification thereof;

FIG. 6 is an enlarged fragmentary sectional view of a portion of the construction illustrated in FIG. 2;

FIG. 7 is a transverse sectional view taken on line 7—7 of FIG. 3;

FIG. 8 is an enlarged axial sectional view illustrating another modification of the construction illustrated in FIG. 4.

Referring to the drawings which illustrate the preferred embodiments of the invention, the numeral 10 designates the body of a vehicle which is mounted upon suitable running gear. The running gear includes rear axle 12 and wheels 14. The vehicle is provided with springs 16 interconnecting the body 10 and axle 12 in the manner well understood in the art and serving to provide a yielding support of the vehicle body upon the running gear of the vehicle. Shock absorbers or stabilizers 18 also provide an interconnection between the axle 12 and the body 10 and serve to snub or damp the action of the springs when the vehicle travels over rough terrain.

My improved shock stabilizers 18 are adapted to provide the additional function of adjustment for the purpose of levelling a vehicle body which is subjected to overload. For this purpose the shock absorbers 18 are connected in a gas supply system as illustrated schematically in FIG. 1. This gas supply system includes a charged gas container 20, such as a conventional $CO_2$ bottle which may be charged at a pressure in the order of 1000 pounds per square inch, or any other selected pressure charge. The container 20 will be mounted in the vehicle in any suitable location. A pressure regulator 22 has connection with the charged gas container 20 for the purpose of regulating or limiting to a selected value the pressure of the gas which is discharged from the container to a supply line 24. The pressure regulator 22 may be of the type illustrated in my co-pending application, Ser. No. 322,303, filed November 8, 1963, mentioned above. The gas supply line 24 has interposed therein a gas supply valve 26 which preferably is adapted for fingertip operation and which may be located in the vehicle in a convenient position, as at the dashboard or instrument panel thereof. The valve 26 is normally closed and, when operated, opens the supply line 24 to feed therein and to lines 28 connected to the shock stabilizers 18 gas under pressure supplied from the container 20. The gas supply system may also include a pressure gauge 30 located convenient to view by the operator of the vehicle while he manipulates the valve 26. A manually controlled bleed valve 32 is also connected to the gas supply system and is normally closed but is adapted to be manually opened for the purpose of bleeding gas under pressure from the supply line 24, the gas feed line 28 and the shock stabilizers 18 at the will of the operator. Bleed valve 32 may also be located in a convenient position in the vehicle, as at the dashboard or instrument panel thereof.

One embodiment of the shock stabilizer is illustrated in FIGS. 2, 3, 6 and 7, and is particularly suitable for use with small vehicles, such as automobiles commonly referred to as compact autos. In this construction the device is provided with an elongated tubular body 40 which fixedly mounts at one end, as at its lower end, a closure cap or sealing member 42 which is fixedly secured to the tubular body 40 in any suitable manner. Cap 42 preferably has an axial threaded stud 44 projecting therefrom to detachably or replaceably mount a connected member 46 adapted for pivotal connection with the mounting bracket carried by the axle of the vehicle. The upper end of the tubular member 40 is spanned by a seal 48 mounted in any suitable manner, as by means of a cap retainer 50. Sealing ring 48 preferably constitutes a seal of well known construction in the nature of a washer-like body of resilient material having an outer annular lip 52 and an inner annular lip 54, both being of V-shape in cross-section at the inner periphery of the seal.

An elongated tubular member 56 has a snug sealed sliding fit in the sealing ring 48 engaged by the inner and outer lips of the latter. The outer end of the tubular member is closed as by a plug 58 and preferably is screw-threaded to mount connector member 60 adapted for connection to a bracket carried by the vehicle body 10. A fitting 62 is carried by the tubular member 56 adjacent to the connector member 60 and provides means for connection of the gas line 28. The fitting 62 communicates with the bore of the tubular member 56.

At its inner end the tubular member 56 mounts a liquid-controlling piston 64. One form which the liquid-controlling piston may take is illustrated in FIGS. 3 and 7, wherein said valve is mounted upon a reduced diameter screw-threaded end portion 66 of tubular member 56. An apertured spring disk 68 encircles tube part 66, and a disk 70 bears against the spring disk 68. An annular member 72 encircles tube part 66 and bears against disk 70. Annular member 72 has a snug sliding fit in the tubular body 40 and preferably has an outer annular seal 74. An annular series of openings 76 extend through the member 72, and one or more smaller openings 78 extend through the member 72 at a greater spacing to the outer annular surface thereof. Disk 70 has openings registering with the openings 78 of the member 72. A spring disk 80 bears against the surface of annular member 72 opposite that engaged by the disk 70 and is clear of openings 76 thereof. A conical abutment member 82 bears against the spring disk 80, and the parts are held in assembled relation by an annular internally screw-threaded gland member 84 of substantially cup-shape having a central opening in its end wall for purposes to be described.

The liquid controlling piston member 64 of the construction above described, or of the construction illustrated and described in my copending application, Ser. No. 322,300, or of any other suitable construction, serves to provide for flow through the openings 76 upon the down stroke of the piston and to limit flow therethrough in a restricted manner through the openings 78 upon the upstroke of the piston, in a manner well understood in the art.

An elongated tubular member 86 has a sliding fit in the bore of the tubular member 56 and projects through the opening of the gland member 86 which retains sealing rings 88 encircling tubular member 86 to provide a liquid-tight seal, preventing the entry of liquid into the bore of the tube 56 around the tubular member 86. Tubular member 86 is open at both ends thereof, and at its lower end mounts a seal or piston member 90. The seal or piston member 90 bears at its inner face against an abutment 92 carried by tubular member 86 spaced from its free end. At its opposite end the piston 90 is preferably engaged by a washer 94 held in place by a nut 96 screw-threaded on the free end of the tubular member 86. The seal or piston is preferably an annular member formed of rubber or other resilient material flaring adjacent its periphery and having a central peripheral groove 98 defining a pair of circumferential lips, each of substantially V-shape in cross-section.

It will be apparent that in the operation of the device, when the tubular body 40 contains a liquid such as oil in the portion thereof above the piston 90, and the chamber in the body 40 below the piston 90 contains gas under pressure, the device will perform its shock-stabilizing function in normal manner upon sliding of the piston 64 within the tubular body 40. The gas supply means provides for elongation of the stabilizer between the connectors 46 and 60 thereof when gas under pressure is added to the system. Likewise, the space between the connectors 46 and 60 may be reduced by bleeding gas under pressure through the valve 32. By this arrangement, variations of the attitude of vehicle body 10 caused by differences in loading thereof, and resultant differences in flexure of the vehicle springs 16, may be accommodated. The construction is simple and inexpensive and eliminates the need for a dust shield. Longitudinal alignment of the tubular member 56 and the body 40 is effected by the spaced aligning functions of the seal 48 and the piston 64, and serves adequately for this purpose in installations in small lightweight vehicles. It will also be observed that the use of the tubular member 56, providing communication with the bottom portion of the tubular body 40, permits connection of the line 28 at a part of the device which is connected to the vehicle body 10, so that minimum risk of damage to the device during operation occurs. In other words, the lines 28 are not subjected to any of the stresses occurring incident to deflection of the vehicle springs 16 during usage.

Another embodiment of the invention which provides for the use of a dust shield, and which is adapted for use on heavier installations, is illustrated in FIGS. 4, 5 and 8.

The construction illustrated in FIG. 5 utilizes an outer tube 100 spanned at one end by an upper end cap 102 fixedly mounted in the tube 100 and provided with a seal 104.

Cap 102 has a central opening therein through which extends an elongated tubular piston rod 106 anchored in fixed position by a retainer 108 and provided with an annular seal 110. The upper or outer end of tubular piston rod 106 projects from the cap and is screw-threaded to mount a connector 112. Cap 102 has a passage 114 therein at which is mounted a fitting 116 to which is connected a gas pressure tube 28. Tubular piston rod 106 has an opening 118 therein at the portion thereof adjacent to the cap 102.

A liquid tube or body 120 fits within the outer tube 100 with clearance and receives the elongated tubular piston rod 106 therein. The upper end of the tubular body 120 is spanned by a closure cap 122 having a central opening slidably receiving the tubular piston rod 106 and carrying an annular internal seal 124 retained by an inner washer 126. Cap 122 has a cylindrical sleeve portion 128 encircling the upper end of the liquid tube body 120 and preferably having a pair of spaced guide rings 130 having a snug sliding fit in tubular body 100 and also having an annular resilient sealing member 132, such as an O-ring. Closure cap 122 provides a fluid retaining seal at the upper end of the liquid tube or body 120.

The opposite or lower end of the liquid tube or body 120 mounts a sealing cap 134 having a fluidtight seal with the tubular body 120 and carrying a lower connector 136.

The tubular piston rod 106 mounts a liquid controlling piston 138 slidable in the liquid tube or body 120. Liquid controlling piston 138 may be of any suitable construction permitting rapid flow of liquid therethrough upon the downstroke of the piston within the tubular body 120, and providing for a restricted or reduced rate of flow therethrough upon movement in reverse direction. Thus the piston may be of the character illustrated in FIGS. 3 and 7, or as illustrated in my copending application, Ser. No. 322,300, and serves the same function conventionally served by the liquid piston of an hydraulic shock absorber or stabilizer.

An elongated tube 140 of a diameter to have a sliding fit in the bore of the tubular piston rod 106 extends through a sealing gland 142 which may be similar to the gland 84, 88 illustrated in FIG. 3. At its lower free end the telescoped or inner tube 140 mounts a gas piston 144 having a central opening in which the lower end of the telescoped tube 140 is mounted and which accommodates discharge of gas into the tubular body 120 between the gas piston 144 and the end cap 134. Gas piston 144 preferably has an annular seal 146 therearound and may have a filling opening closed normally by a screw-threaded closure member 148.

This construction has the same advantages as the embodiment previously described, but additionally is characterized by two communicating gas chambers provided at opposite ends of the stabilizer. One of these gas chambers is located within the outer tube 100 between the end cap 102 and the closure cap 122 of the liquid tube or body 120. The second gas chamber is located at the lower end of the liquid tube or body 120 between the gas piston 144 and the end cap 134. Gas under pressure is supplied to these two chambers from tube 28, fitting 116, to the upper of the chambers, and through opening 118 in tubular piston 106 and thence through the telescoped or inner tube 140 to the space below the gas piston 144.

It will be apparent that opening of the valve 26 will supply gas under pressure from container 20 as regulated by pressure regulator 22 to the two shock stabilizers to enter the upper and lower gas chambers thereof and act upon the parts in a manner to elongate the stabilizer and thereby to elevate the vehicle body 10 by supplementing the supporting action of the vehicle springs 16. Likewise opening of the bleed valve 32 will reduce the gas pressure in the upper and lower chambers of the device and permit shortening of the distance between the connectors 112 and 136, so as to reduce the gas pressure assistance given by the stabilizer to the vehicle springs.

In the modified construction illustrated in FIG. 5, parts similar to those in FIG. 4 bears the same reference numerals. The end closure cap 123 has an opening providing clearance with the tube 106 and retains the margin of a resilient annular seal 150 which is preferably provided with a metallic reinforcement 152 and which has a thickened central part with the bore having a snug sealing fit upon the tube 106 and grooved at 154 circumferentially at said opening to define upper and lower annular lips preferably of substantially V-shape in cross-section and effective to prevent the leakage of liquid between the same and the tube 106 incident to operation of the device. The cap 123 has the same sleeve part 128 encircling and secured to the upper end of the tubular body 120 and in turn encircled by the guide rings 130 and the sealing ring or O-ring 132 previously described.

The FIG. 5 construction provides an alternate seal eliminating the use of an O-ring as in the FIG. 4 construction and effective to seal against entry of gas under pressure from the upper chamber into the liquid tube chamber 120 and effective to prevent leakage of liquid from the liquid tube chamber 120 into the upper gas chamber at the upper part of the tube 100.

The embodiment illustrated in FIG. 8 constitutes another variation of the construction of the seal between the upper gas chamber and the upper part of the liquid tube or chamber 120, and parts therein similar to those used in FIG. 4 bear the same reference numerals. In this construction the cap 123 mounted on the end of the liquid tube or body 120 confines a resilient annular seal 150 in cooperation with an inner cap member 156 whose outer face is recessed to provide a clearance therebetween and the central portion of the seal 150. An O-ring or other seal 158 is carried by a groove of the inner cap member 156 to provide a seal between inner cap member 156 and the tubular piston rod 106. A passage 160 is formed in the inner cap member 156 in communication with the cavity between the inner cap member 156 and the seal member 150. The passage 160 extends to the external surface of the liquid tube or body 120. Sleeve part 128, which fits around the liquid tube 120, is scored internally at 162 in communication with the passage 160.

The FIG. 8 construction is of particular importance in positively insuring against any pumping action which tends to cause liquid within the tubular body 120 to enter the inner chamber above the seal 150. Thus as any leakage occurs past the seal 158 to enter the space between the inner cap 156 and the seal 150, such leakage is vented through the passage 160 and the score 162 to atmosphere.

While the preferred embodiments of the invention have been illustrated and described, it will be understood that changes in the construction may be made within the scope of the appended claims without departing from the spirit of the invention.

I claim:

1. A vehicle shock stabilizer comprising
a liquid-containing tubular body,
an end cap carried by the upper end of said body and having a central aperture,
a piston slidable in said body and accommodating liquid flow therepast at a controlled rate,
a tubular piston rod carried by said piston and open therebelow,
said piston rod extending through said cap aperture,
said end cap including sealing means encircling said piston rod,
an inner tubular member having a sealed sliding fit in said tubular piston rod,
an end cap closing the lower end of said body,
a seal carried by the lower end of said inner tube and dividing said body into a gas chamber below said seal and a liquid chamber above said seal,
said inner tube communicating with said gas chamber, and
means for supplying gas under pressure to said piston rod for passage therethrough and through said inner tube to said gas chamber.

2. A vehicle shock stabilizer comprising
an elongated cylinder closed at its lower end,
an upper end cap having a central opening and a seal,
a piston slidable in said cylinder and apertured to accommodate liquid flow therethrough at different rates in opposite directions,
a tubular piston rod carried by said piston and extending slidably through said cap aperture and seal,
an inner tube having a sealed sliding fit in said piston rod and projecting below said piston,
a disk on said inner tube having a sealed slide fit in said cylinder and an opening therethrough communicating with said inner tube, and
means supplying gas under pressure to said piston rod above said end cap.

3. The combination defined in claim 2, wherein
said end cap mounts a pair of axially spaced piston-rod-encircling sealing members and provides a cavity therein between said sealing members, and
means venting said cavity to atmosphere.

4. The combination defined in claim 2, wherein
said end cap includes spaced inner and outer apertured parts defining a cavity therebetween,
an outer seal spanning said cavity and encircling said piston rod,
an inner seal carried by said inner end cap part and encircling said piston rod, and
a vent passage in said inner cap part and communicating with said cavity and with atmosphere.

5. A vehicle shock stabilizer comprising
an elongated cylinder closed at its lower end,
an upper cap having a central opening and a seal,
a piston slidable in said cylinder and apertured to accommodate liquid flow therethrough at different rates in opposite directions,
a tubular piston rod carried by said piston and extending slidably through said cap aperture and seal,
an inner tube having a sealed sliding fit in said piston rod and projecting below said piston,
a disc carried by the lower end portion of said inner tube and having a sealed slide fit in said cylinder to define a first gas chamber therebelow,
an elongated cylinder carried by said piston rod and encircling a part of said first cylinder and defining a second gas chamber thereabove, and
means supplying gas under pressure to said second gas chamber,
said piston rod having an opening therein within said second gas chamber.

6. A vehicle shock stabilizer comprising
an elongated cylinder closed at its lower end,
a disk having a sliding sealed fit in said cylinder to define a lower gas chamber and an upper liquid chamber therein,
a piston slidable in said liquid chamber and apertured for liquid flow therethrough at different rates in opposite directions,
an upper end cap with an aperture and a seal at said aperture,
a tubular piston rod carried by said piston and slidable in said end cap aperture,
a tubular member carried by said piston rod and partly encircling said cylinder with a sealed fit to define an upper gas chamber,
means cooperating with and shiftable relative to said tubular piston rod for establishing communication between said upper and lower gas chambers, and means for charging said gas chambers with gas under pressure.

7. A vehicle shock stabilizer, comprising an elongated cylinder closed at its lower end, a disk having a sliding sealed fit in said cylinder to define a lower gas chamber and an upper liquid chamber therein, a piston slidable in said liquid chamber and apertured for liquid flow therethrough at different rates in opposite directions, an upper end cap with an aperture and a seal at said aperture, a tubular piston rod carried by said piston and slidable in said end cap aperture, a tubular member carried by said piston rod and partly encircling said cylinder with a sealed fit to define an upper gas chamber, means cooperating with and shiftable relative to said tubular piston rod for establishing communication between said upper and lower gas chambers, means for charging said gas chambers with gas under pressure, said upper end cap having spaced upper and lower piston-rod-encircling seals and a cavity therebetween, and means for venting said cavity to atmosphere.

References Cited by the Examiner
UNITED STATES PATENTS

| | | | |
|---|---|---|---|
| 2,364,823 | 12/1944 | Schnell | 267—64 |
| 2,735,634 | 2/1956 | Fosness | 267—64 |
| 2,768,849 | 10/1956 | Riesing | 188—100 |
| 2,890,770 | 6/1959 | Smallpeice | 188—100 |

ARTHUR L. LA POINT, *Primary Examiner.*

H. R. FIELD, R. M. WOHLFARTH, *Assistant Examiners.*